L. S. LACHMAN.
CORRUGATED WELDING STRIP.
APPLICATION FILED AUG. 9, 1913.

1,094,910.

Patented Apr. 28, 1914.

WITNESSES
James Phelan
George Brew.

INVENTOR
LAURENCE S. LACHMAN.
BY Townsend & Decker.
ATTORNEYS

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

CORRUGATED WELDING-STRIP.

1,094,910.  Specification of Letters Patent.  Patented Apr. 28, 1914.

Application filed August 9, 1913. Serial No. 783,903.

*To all whom it may concern:*

Be it known that I, LAURENCE S. LACHMAN, a citizen of the United States, and a resident of New York, in the county of New York and State of New York, have invented certain new and useful Improvements in Corrugated Welding-Strips, of which the following is a specification.

My invention relates to the art of electric welding and more particularly to that special manner of practising the art wherein plates or sheets of metal or the edges of a sheet formed into a tube are united by the application of welding contact pieces of metal applied to superposed plates or sheets or to plates or sheets at meeting or abutted edges thereof and engaging said plates or sheets at separated points or intervals so as to form welds at spots or isolated places of welding.

The invention comprises essentially a series of welding contact pieces united or connected by a metal strip of substantially uniform width, whereby it is made possible to conduct the operation as a continuous operation by the use of a roller electrode without heating or damage to the surface thereof, which is liable to occur with previous forms of welding strips or strings of contact pieces wherein the contact pieces are joined by comparatively narrow spacing connections.

Figure 1:
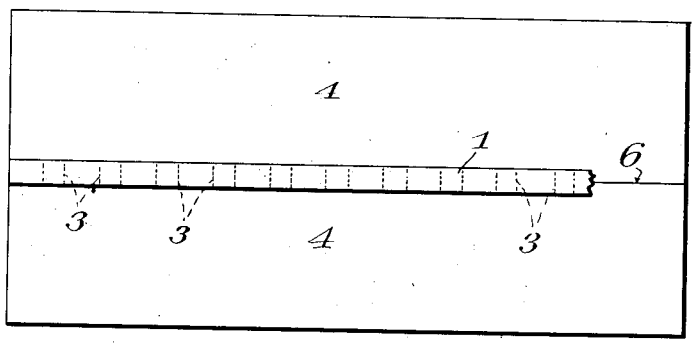
Figure 2:
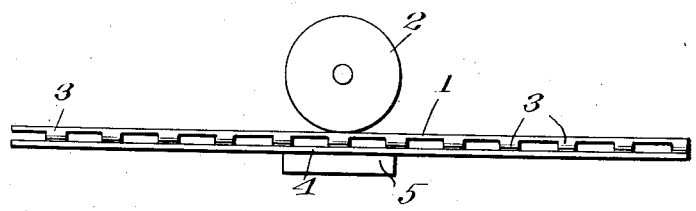
Figure 3:
Figure 4:
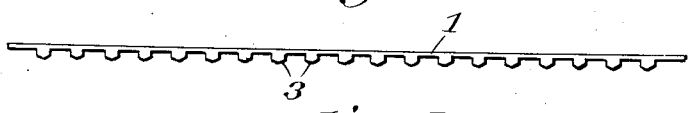
Figure 5:

In the accompanying drawing, Figure 1 is a plan of a strip embodying my invention, the position of the welding contacts being indicated by dotted lines extending across the welding strip, and the strip being shown applied at a portion of the joint formed by the meeting or abutted edges of two plates or sheets of metal. Fig. 2 is an edge view of said strip and sheets with the pressure welding roller or electrode engaging the strip for the welding operation. Fig. 3 is an inverted plan view of the welding strip. Fig. 4 is an edge view of a modified form of said strip. Fig. 5 is a cross-section of said strip through one of the welding contacts or projections.

The metal strip as shown in Figs. 1, 2 and 3 is indicated at 1 and is of substantially uniform width on its upper surface where engaged by the pressure welding roll 2. On its lower surface said welding strip is provided with a series of welding projections 3 which engage and bridge the edges of the two sheets of metal 4, when applied to the joining of two sheets edge to edge, so as to become welded thereto by the action of the pressure welding roll or electrode 2 when the parts are assembled between said electrode and an opposite plate or electrode 5 for the passage of the heating electric current and application of welding pressure. The said welding projections 3 may be spaced apart any desired distance or interval and serve to unite the pieces by becoming welded thereto and bridging the longitudinal joint indicated by the line 6 where the edges of the plates 4 meet or are abutted. The form of the projections 3 may be varied as desired but it is convenient and will aid in the operation to bevel or reduce the lower edge of said projections where they engage the material, as seen in Figs. 4 and 5, so as to form initial contacts of limited superficial area. Also, if desired, and as seen in the cross-section, the projections may be rounded from edge to edge of the strip so as to still further limit the extent of initial contact.

In Figs. 2 and 3 the welded projections are merely rounded from edge to edge of the strip and have a square offset or shoulder where they project from the body of the strip between the edges. The rounded form provides initial contact of small extent.

When applied to the joining of two sheets or pieces of metal 4 edge to edge, the said edges may be brought more or less closely to one another as desired. When a slight separation exists, the body of the strip between projections may be heated to plasticity by the current and forced into the space between the sheets and aid in making the joint. When the series of contacts are made up into a string with the intermediate or uniting portions of the strip narrowed between projections as has heretofore been proposed, there is a tendency to the pitting or grooving of the surface of the welding roller or other form of welding electrode by these narrower portions of the strip.

The form of strip above described avoids the objection to the use of a series or string of welding contact pieces spaced apart and adapted to be applied to the work to space the points of union.

My invention is not limited to any particular form of the welding projections.

As will be seen, my improved welding strip in the form in which it is shown may be described as consisting essentially of a strip of metal having a corrugated lower surface for engaging the parts to be welded and a smooth upper surface to be engaged by the welding electrode or roller. As will be obvious, the strip may be applied to the welding of two sheets or pieces of metal superposed upon one another, the points of union being then practically confined to the location of the welding pieces or projections on the strip by the application of the pressure communicated through the upper sheet or piece to the points of surface contact between the sheets immediately beneath the projections.

What I claim as my invention is:

1. A series of electric welding contact pieces united or connected by a metal strip of substantially uniform width and projecting from said strip transversely to the plane thereof.

2. An electric welding strip consisting of a strip of metal of substantially uniform width on one surface and adapted at its opposite surface to form electric welding contact with the pieces to be united.

3. An electric welding strip consisting of a piece of metal having a smooth upper surface of uniform width where engaged by the welding electrode and provided on its opposite surface with a series of contact projections adapted to engage the sheets or pieces to be united at separated points of union coinciding with the location of said projections along the continuous strip.

4. A welding strip for electric welding operations, comprising a strip of metal having a smooth upper surface of substantially uniform width and provided on its lower surface with a series of separate projections adapted to form welding contacts for uniting plates or sheets of metal at intervals in their meeting edges or surfaces.

Signed at New York in the county of New York and State of New York this 8th day of August A. D. 1913.

LAURENCE S. LACHMAN.

Witnesses:
F. B. TOWNSEND,
GEO. BREW.